(12) United States Patent
Lin et al.

(10) Patent No.: US 8,789,242 B2
(45) Date of Patent: Jul. 29, 2014

(54) SLIDING HINGE AND PORTABLE DEVICE

(75) Inventors: Zheng-Cheng Lin, New Taipei (TW); Shan-Yi Yang, New Taipei (TW)

(73) Assignee: Shin Zu Shing Co., Ltd., New Taipei (TW)

( * ) Notice: Subject to any disclaimer, the term of this patent is extended or adjusted under 35 U.S.C. 154(b) by 140 days.

(21) Appl. No.: 13/343,350

(22) Filed: Jan. 4, 2012

(65) Prior Publication Data
US 2013/0169134 A1 Jul. 4, 2013

(51) Int. Cl.
*E05D 15/00* (2006.01)

(52) U.S. Cl.
USPC ............................................. 16/362; 16/364

(58) Field of Classification Search
USPC ........... 16/239, 337, 223, 242, 246, 281, 299, 16/314, 327, 345, 362, 364; 455/575.3, 455/575.4; 379/433.12, 433.13
See application file for complete search history.

(56) References Cited

U.S. PATENT DOCUMENTS

| | | | |
|---|---|---|---|
| 5,644,469 A | | 7/1997 | Shioya et al. |
| 5,661,927 A * | | 9/1997 | Polowinczak et al. .......... 49/447 |
| 6,929,209 B2 * | | 8/2005 | Baumgarten ................. 242/377 |
| 7,444,716 B2 * | 11/2008 | Hsu ................................. 16/366 |
| 7,564,967 B2 * | 7/2009 | Pan .......................... 379/433.12 |
| 7,725,988 B2 * | 6/2010 | Kim et al. ....................... 16/361 |
| 7,921,516 B2 * | 4/2011 | Chuan ............................ 16/365 |
| 7,975,348 B2 * | 7/2011 | Lin ................................ 16/337 |
| 8,226,054 B2 * | 7/2012 | Chen et al. .................... 248/127 |
| 8,250,711 B1 * | 8/2012 | Chen et al. ..................... 16/354 |
| 8,396,520 B2 * | 3/2013 | Jung .......................... 455/575.4 |
| 2007/0067954 A1 | 3/2007 | Finney et al. |
| 2007/0186380 A1 * | 8/2007 | Kim et al. ....................... 16/239 |
| 2008/0161075 A1 * | 7/2008 | Kim et al. ................... 455/575.4 |
| 2009/0007383 A1 * | 1/2009 | Lee ................................ 16/362 |
| 2009/0144933 A1 * | 6/2009 | Chen ............................. 16/277 |
| 2009/0178242 A1 * | 7/2009 | Lin ................................ 16/341 |
| 2010/0064477 A1 * | 3/2010 | Wang ............................. 16/297 |

FOREIGN PATENT DOCUMENTS

CN 202269115 U 6/2012

\* cited by examiner

*Primary Examiner* — Emily Morgan
(74) *Attorney, Agent, or Firm* — Alan D. Kamrath; Kamrath IP Lawfirm, P.A.

(57) ABSTRACT

A sliding hinge for a portable device has a main bracket, a mounting panel and a plate spring assembly. The mounting panel is slid relative to the main bracket. A tether of the plate spring assembly is attached securely to the mounting panel. The mounting panel is attached securely to a cover of the portable device. A hub of the plate spring assembly is attached securely to a base of the portable device. When the cover is slid to open, the plate spring assembly forces the cover to be fully opened. Therefore, the cover slides to be fully opened without external forces.

8 Claims, 15 Drawing Sheets

SLIDING HINGE AND PORTABLE DEVICE

BACKGROUND OF THE INVENTION

1. Field of the Invention

The present invention relates to a sliding hinge and, especially, to a sliding hinge mounted between a cover and a base of a portable device.

2. Description of the Prior Arts

With the growing popularity of the portable devices, the portable devices are developed with different kinds of applications. For example, the traditional tiling notebook computer is obsolete. The sliding notebook computer with a touch panel is now popular. The sliding notebook computer has a conventional sliding hinge to allow the cover to slide relative to the base. When the cover is fully opened, the sliding hinge also allows the cover to pivot relative to the base. However, when the cover is slid, the user needs to provide enough force to fully open the cover. Especially when the cover is large, the user needs to provide more power. If the user provides insufficient force so that the cover is not fully opened, pivoting the cover will cause the conventional sliding hinge to be damaged or the cover to bump into the base.

To overcome the shortcomings, the present invention provides a sliding hinge to mitigate or obviate the aforementioned problems.

SUMMARY OF THE INVENTION

The main objective of the present invention is to provide a sliding hinge that ensures the cover is fully opened when the cover is slid to open. The sliding hinge for a portable device has a main bracket, a mounting panel and a plate spring assembly. The mounting panel is slid relative to the main bracket. A tether of the plate spring assembly is attached securely to the mounting panel. The mounting panel is attached securely to a cover of the portable device. A hub of the plate spring assembly is attached securely to a base of the portable device. When the cover is slid to open, the plate spring assembly forces the cover to be fully opened. Therefore, the cover slides to be fully opened without external forces.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
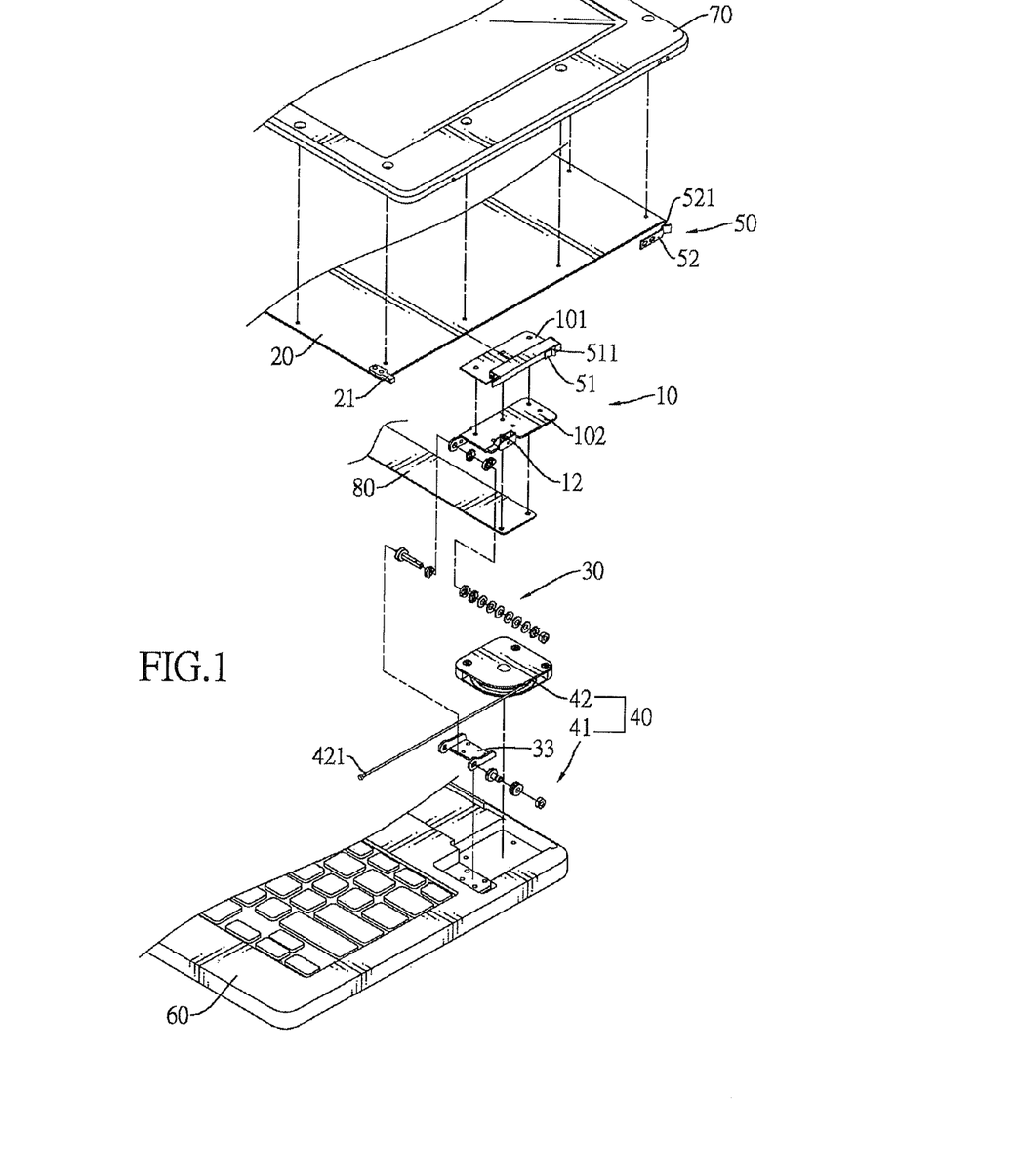
FIG. 1 is an exploded perspective view of a sliding hinge in accordance with the present invention.
Figure 2:
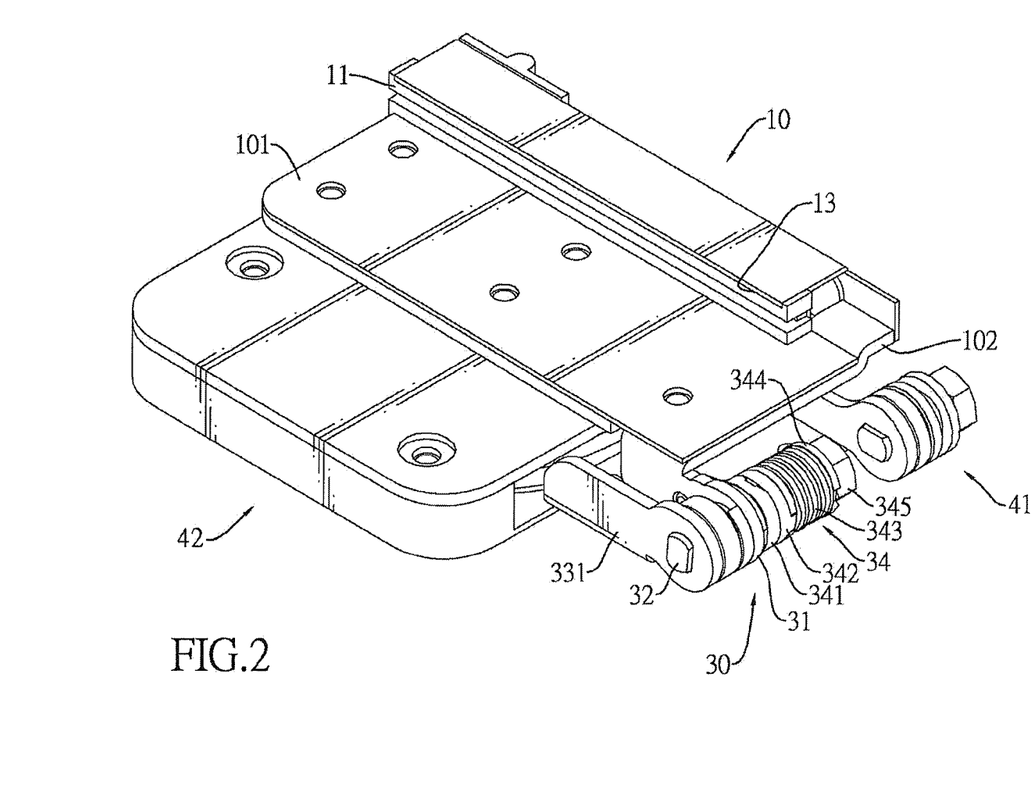
FIG. 2 is a partial perspective view of the sliding hinge in FIG. 1.

With reference to FIGS. 1 and 2, a sliding hinge in accordance with the present invention comprises a main bracket 10, a mounting panel 20, a tilting assembly 30, a recovery assembly 40 and a locking assembly 50.

Figure 3:
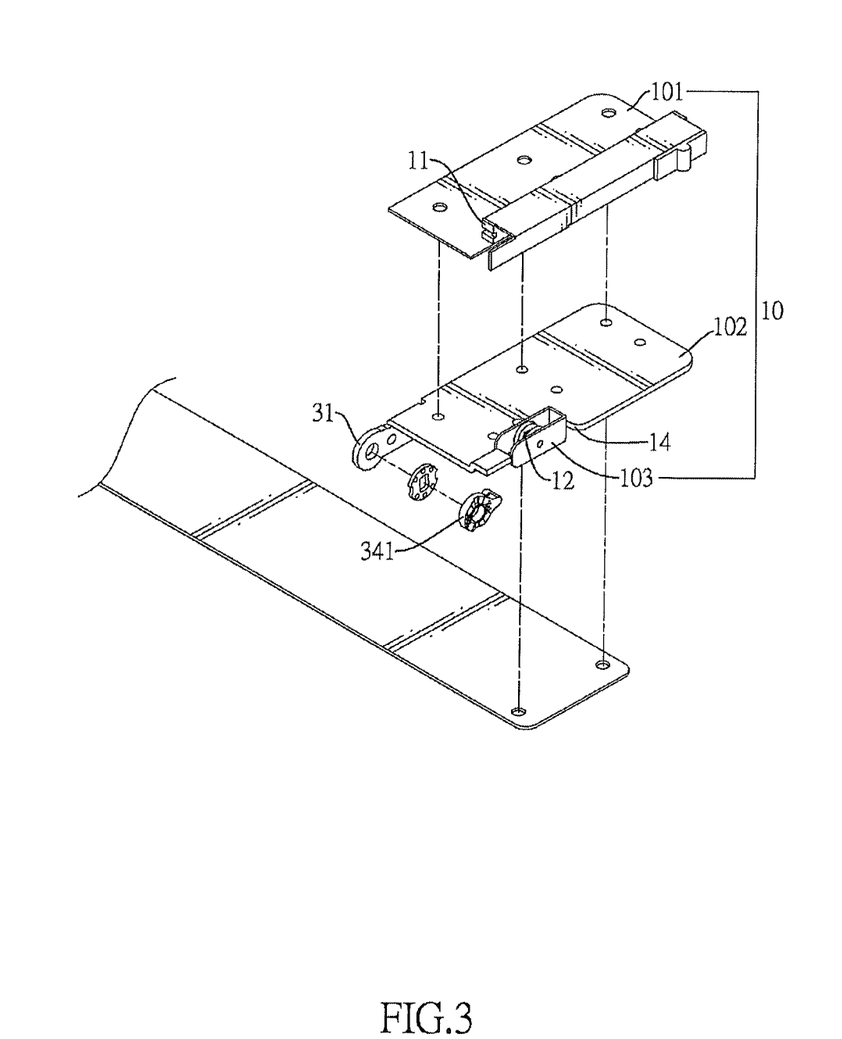
FIG. 3 is a partial exploded perspective view of the sliding hinge in FIG. 1.

With reference to FIGS. 1 to 3, the main bracket 10 has a sliding track 11 mounted on an inner side thereof and a first roller 12 mounted pivotally therein. In a preferred embodiment, the main bracket 10 comprises an upper bracket 101, a lower bracket 102 and a pivoting seat 103. The upper bracket 101 has a receiving recess 13 formed by bending one side of the upper bracket 101. The receiving recess 13 has an opening facing the inner side of the main bracket 10. The sliding track 11 is mounted securely in the receiving recess 13. The lower bracket 102 is attached securely to the upper bracket 101 and has a mounting recess 14 formed on an outer side of the lower bracket 102. The pivoting seat 103 is mounted securely in the mounting recess 14 and has a top opening and a bottom opening. The first roller 12 is mounted pivotally in the pivoting seat 103 as shown in FIG. 3 (the first roller 12 is behind the sliding track 11 and is in the receiving recess 13 in FIG. 2).

With reference to FIG. 1, the mounting panel 20 is mounted slidably in the sliding track 11 of the main bracket 10.

With reference to FIGS. 1 to 4, the tilting assembly 30 is connected to the main bracket 10 and comprises a rotating bracket 31, a pivoting rod 32, a stationary bracket 33 and a torsion generating assembly 34. The rotating bracket 31 is attached securely to the main bracket 10. In a preferred embodiment, the rotating bracket 31 is formed on and protrudes out from the lower bracket 102 of the main bracket 10. The pivoting rod 32 is mounted rotatably through the rotating bracket 31. The stationary bracket 33 is mounted securely around the pivoting rod 32. In a preferred embodiment, the stationary bracket 33 has a first stationary spacer 331 and a second stationary spacer 332. The first and second stationary spacers 331, 332 are respectively formed on an edge of the stationary bracket 33 and are separated from each other. The pivoting rod 32 is mounted securely through the first stationary spacer 331. The torsion generating assembly 34 is mounted around the pivoting rod 32 to provide torque, is mounted between the first and second stationary spacers 331, 332 and is attached to the first stationary spacer 331. The torsion generating assembly 34 may comprise a rotating positioning washer 341, a stationary positioning washer 342, multiple resilient washers 343, multiple abrasion washers 344 and a fastening washer 345. The washers 341, 342, 343, 344, 345 are mounted around the pivoting rod 32. The torsion generating assembly 34 is well known in the art and may alternate as another manner to provide torsion.

Figure 4:
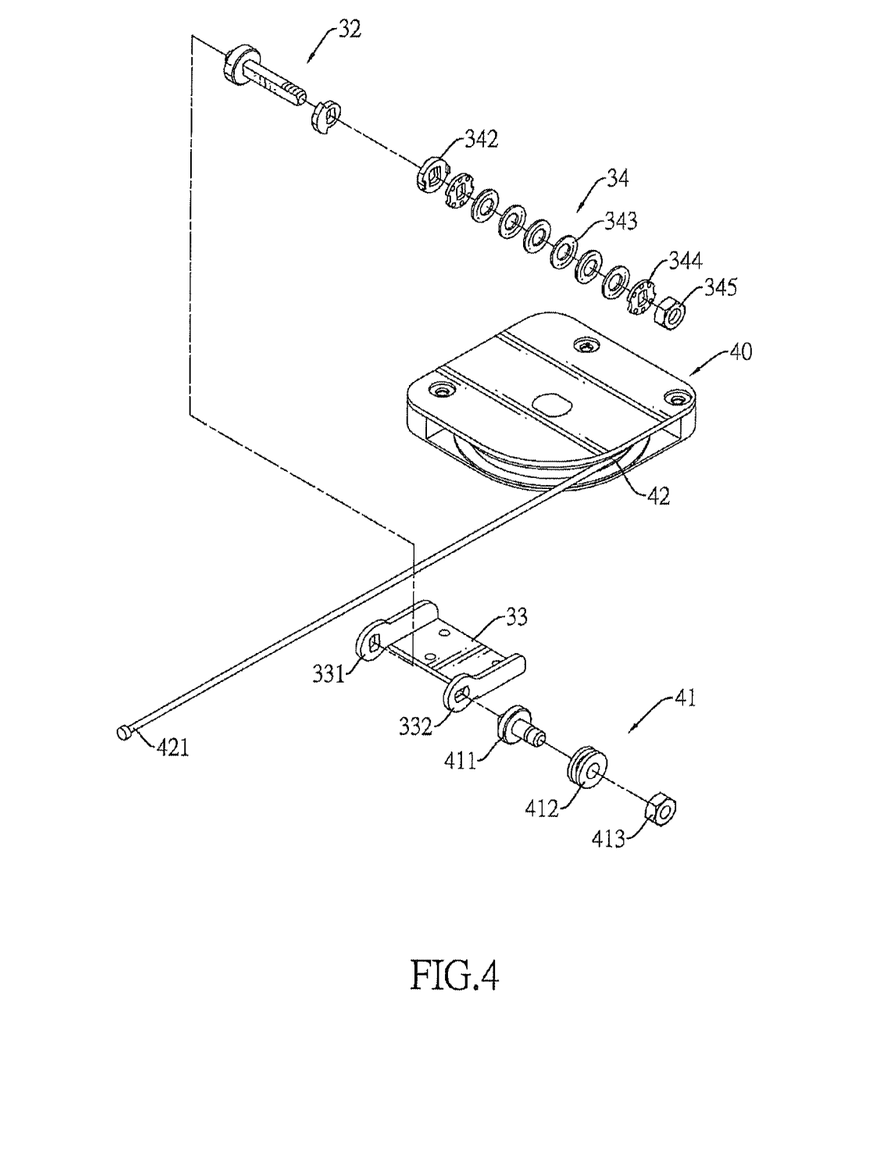
FIG. 4 is a partial exploded perspective view of the sliding hinge in FIG. 1.
Figure 4A:
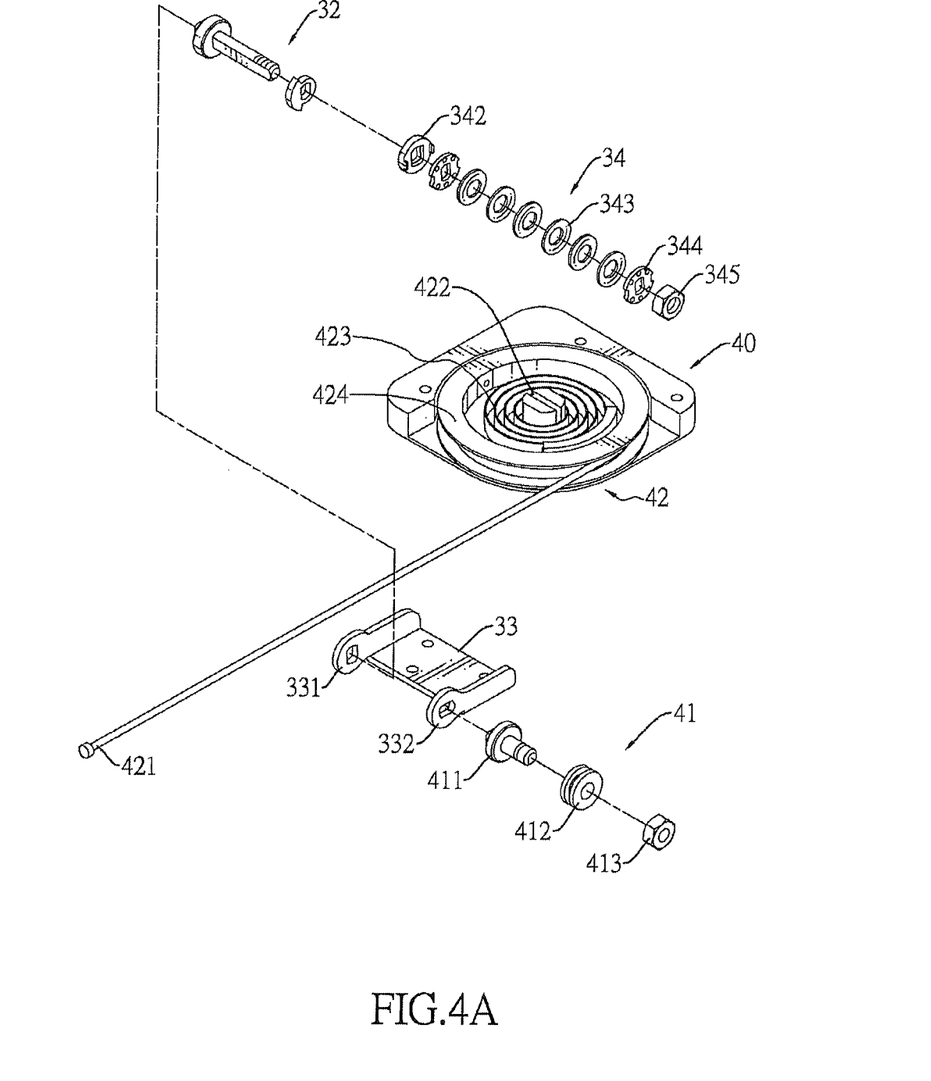
FIG. 4A is a partial exploded perspective view of the sliding hinge in FIG. 1.
Figure 5:
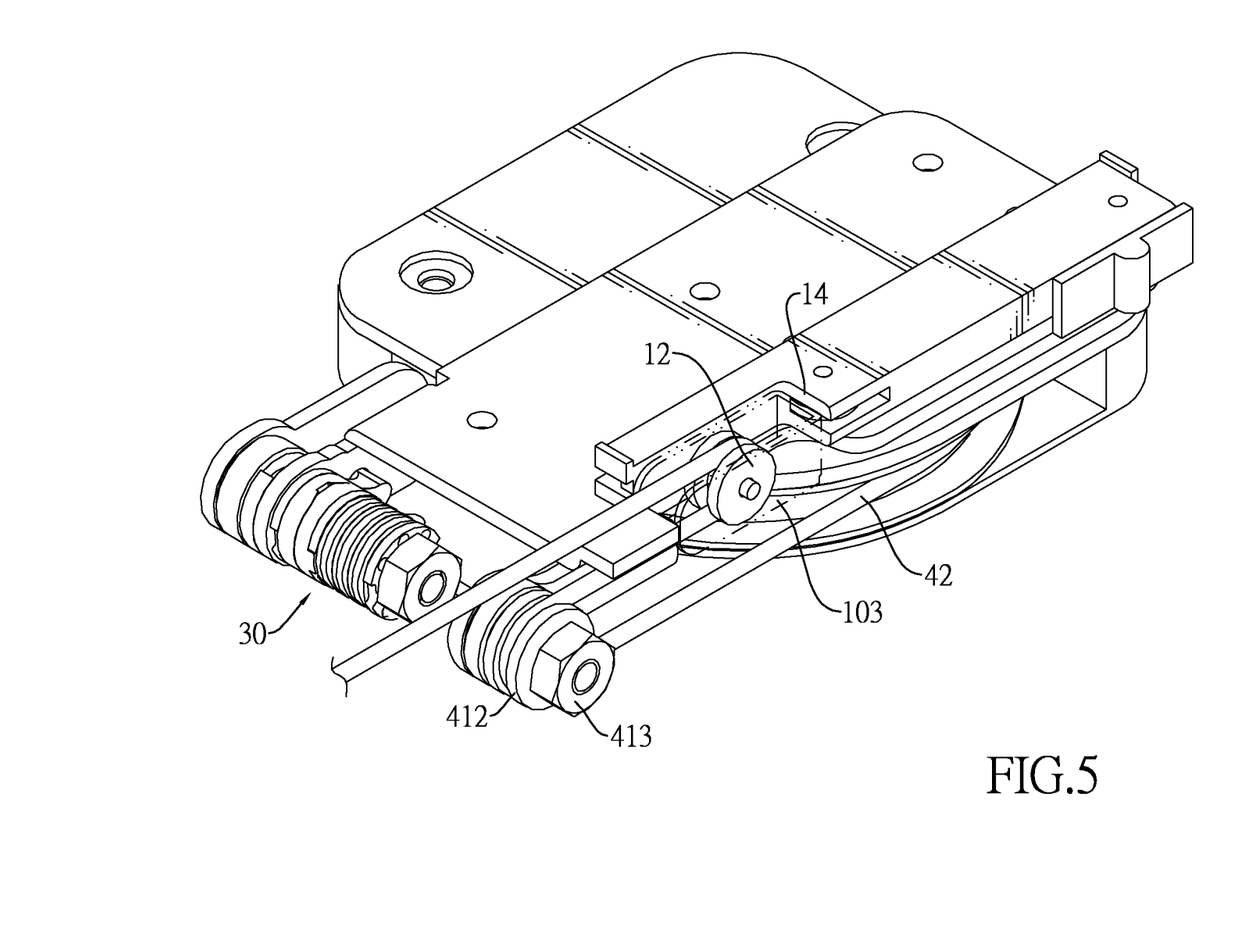
FIG. 5 is an enlarged partial perspective view of the sliding hinge in FIG. 1.

With reference to FIGS. 1, 4, 4A and 5, the recovery assembly 40 is connected to the tilting assembly 30 and comprises a roller assembly 41 and a plate spring assembly 42. The roller assembly 41 is connected to the stationary bracket 33 of the tilting assembly 30 and has a pintle 411, a second roller 412 and a fastener 413. The pintle 411 is mounted securely through the second stationary spacer 332 of the stationary bracket 33. The second roller 412 is mounted rotatably around the pintle 411. The fastener 413 is mounted securely around an end of the pintle 411 to keep the second roller 412 from detaching. As shown in FIG. 4A, the plate spring assembly 42 has a hub 422, a plate spring 423, a bobbin 424, and a tether 421. The bobbin 424 surrounds the plate spring 423 which surrounds the hub 422. One end of the plate spring 423 is attached to the bobbin 424, and the other end of the plate spring 423 is attached to the hub 422. A front part of the tether 421 is wound across the second roller 412 and the first roller 12 in sequence and is attached securely to the mounting panel 20, and a rear part of the tether 421 is attached around the bobbin 424. In a preferred embodiment, the mounting panel 20 has a mounting segment 21 attached securely thereon. The tether 421 of the plate spring assembly 42 is attached securely to the mounting segment 21. The directions of the tether 421 winding around the first and second rollers 12, 412 are opposite. For example, the tether 421 is wound around the second roller 412 clockwise, while the tether 421 is wound around the first roller 12 counterclockwise. In other words, directions of rotations of the first and second rollers 12 and 412 are opposite during use.

With reference to FIGS. 1 and 3, the locking assembly 50 is mounted on an outer side of the main bracket 10 and comprises a stationary resilient sheet 51 and a sliding resilient sheet 52. The stationary resilient sheet 51 is attached securely on the outer side of the main bracket 10 and has an actuating segment 511 formed thereon. The sliding resilient sheet 52 is attached securely on the mounting panel 20, is slid simultaneously with the mounting panel 20, is selectively held by the stationary resilient sheet 51 and has an actuating segment 521 formed thereon. The actuating segment 521 of the sliding resilient sheet 52 corresponds to and selectively abuts the actuating segment 511 of the stationary resilient sheet 51 to allow the mounting panel 20 to resist the resilience of the plate spring assembly 42. In a preferred embodiment, the actuating segments 511, 521 are protrusions. When the sliding resilient sheet 52 is moved and passes the stationary resilient sheet 51, the actuating segment 521 of the sliding resilient sheet 52 pushes the actuating segment 511 of the stationary resilient sheet 51. Then the actuating segment 521 of the sliding resilient sheet 52 slides over and abuts against the actuating segment 511 of the stationary resilient sheet 51 to keep the sliding resilient sheet 52 from being moved by the plate spring assembly 42.

Figure 6:
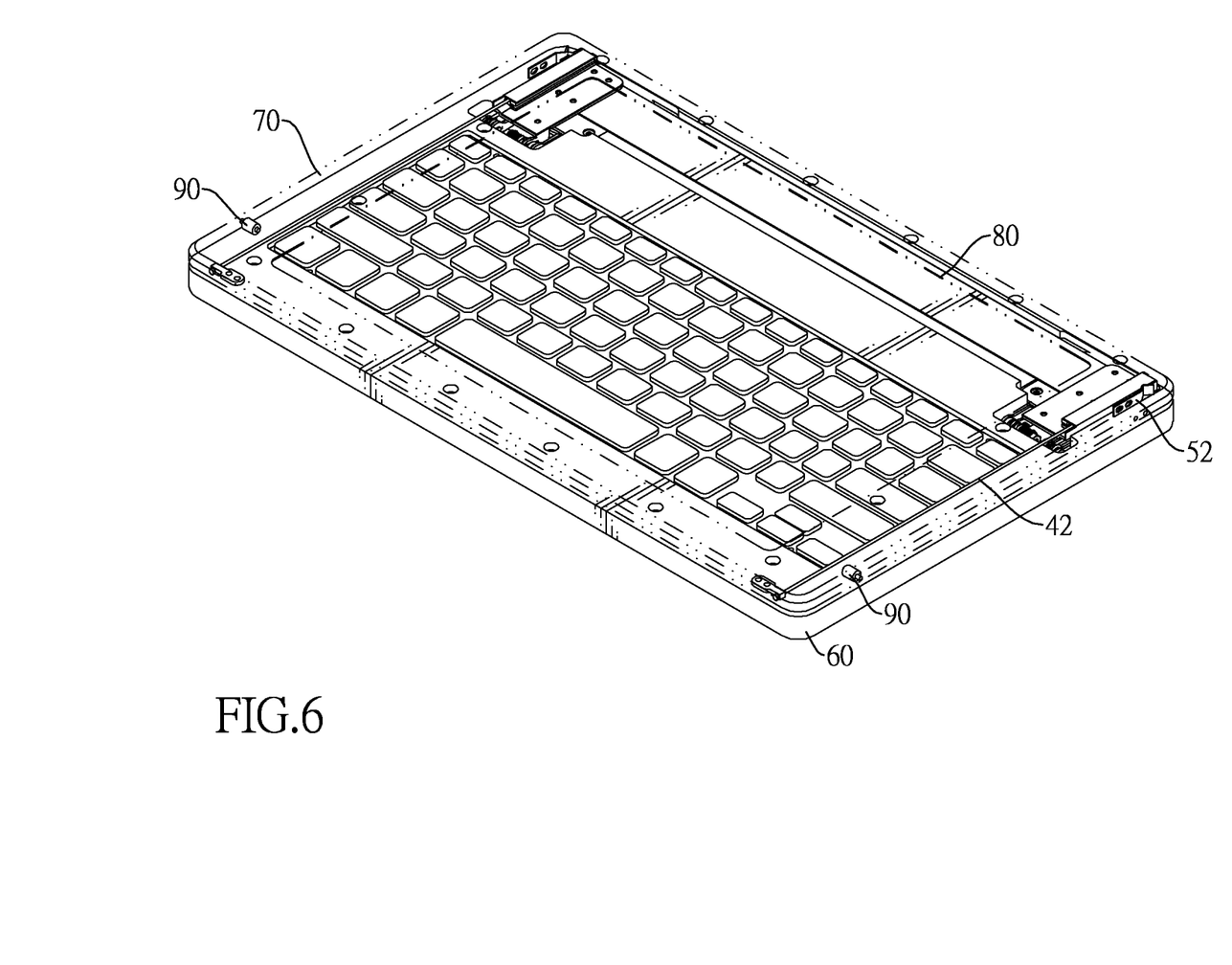
FIG. 6 is an operational perspective view of a portable device in accordance with the present invention, shown closed.

With reference to FIGS. 1, 4A and 6, a portable device in accordance with the present invention comprises two sliding hinges as described, a base 60, a cover 70 and a connecting panel 80. The sliding hinges as described are mounted between the base 60 and the cover 70 and are located respectively at two opposite sides. Two side edges of the mounting panel 20 are respectively mounted slidably in the sliding tracks 11 of the main brackets 10. The hubs 422 of the plate spring assemblies 42 and the stationary brackets 33 are attached securely to the base 60. The mounting panel 20 is attached securely to the cover 70. The connecting panel 80 is mounted across the sliding hinges as described. Two ends of the connecting panel 80 are respectively attached securely to the main brackets 10 to stabilize the main brackets 10 and the rotating brackets 31 while pivoting. The sliding resilient sheets 52 are respectively attached securely to inside walls of the cover 70. In a preferred embodiment, multiple wheels 90 are mounted between the cover 70 and the base 60. The wheels 90 may be mounted on a bottom surface of the cover 70, or are mounted on a top surface of the base 60. When the cover 70 slides relative to the base 60, the wheels 90 reduce the abrasion between the cover 70 and the base 60 to enhance smoothness.

Figure 7:
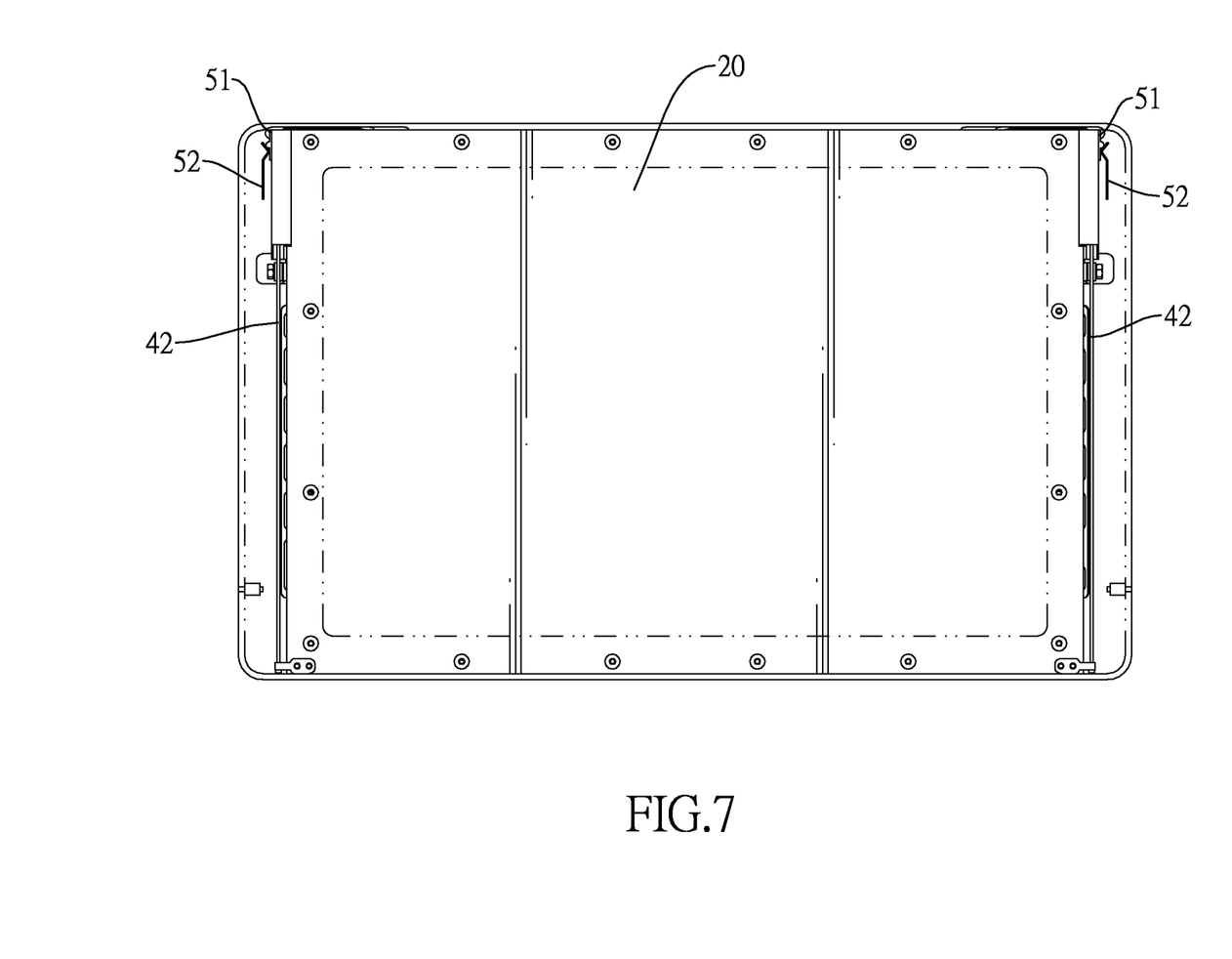
FIG. 7 is an operational top view of the portable device in FIG. 6, shown closed.
Figure 8:
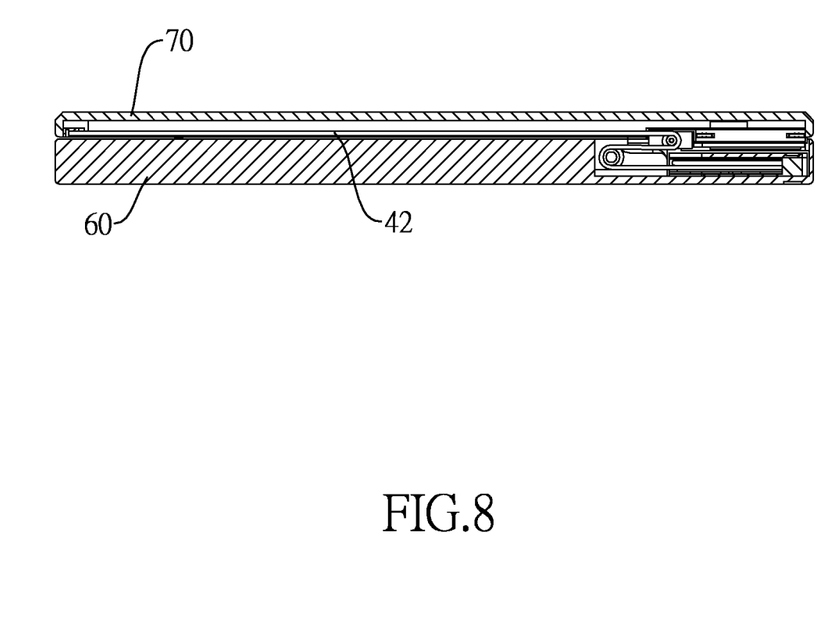
FIG. 8 is an operational side view in partial section of the portable device in FIG. 6, shown closed.
Figure 9:
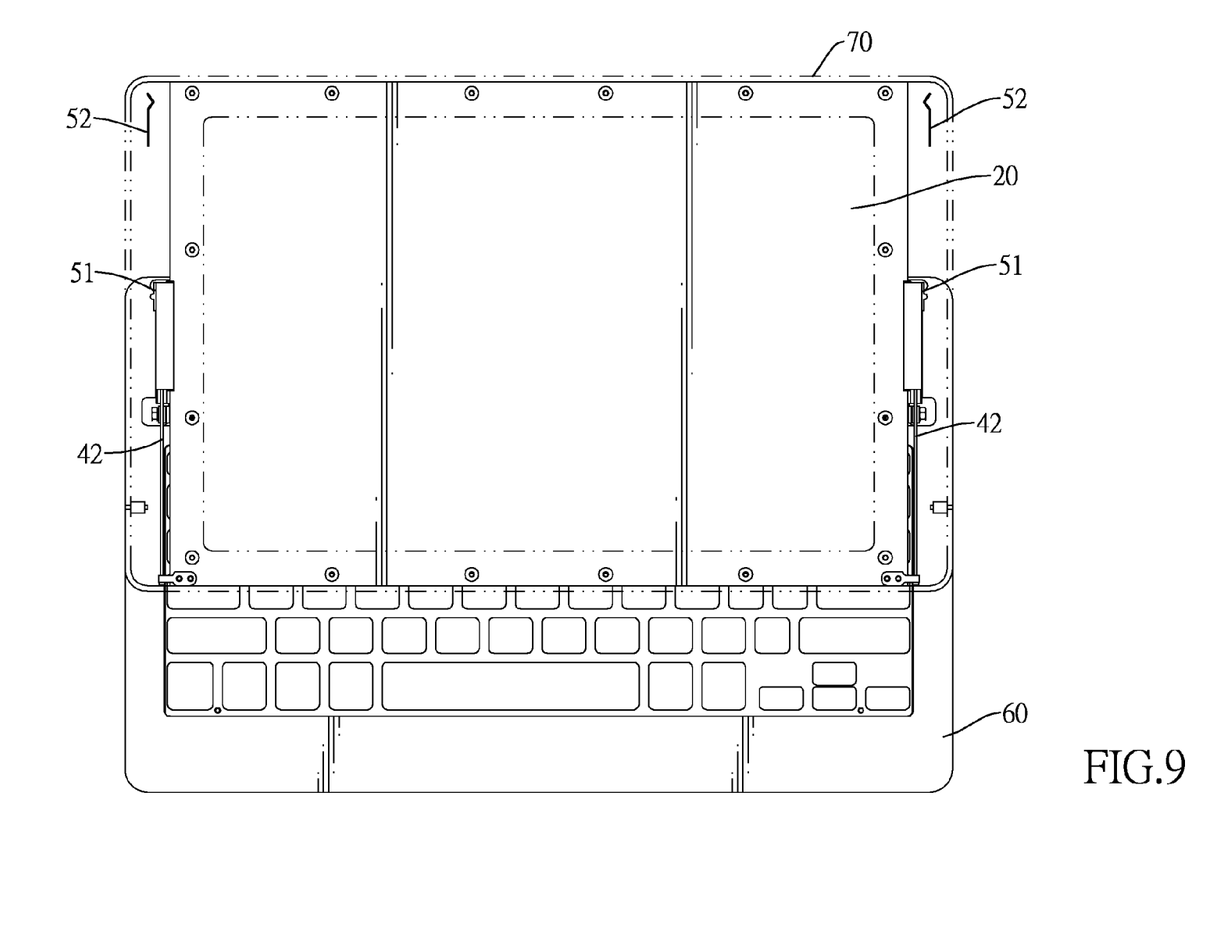
FIG. 9 is an operational top view of the portable device in FIG. 6, shown opening.
Figure 10:
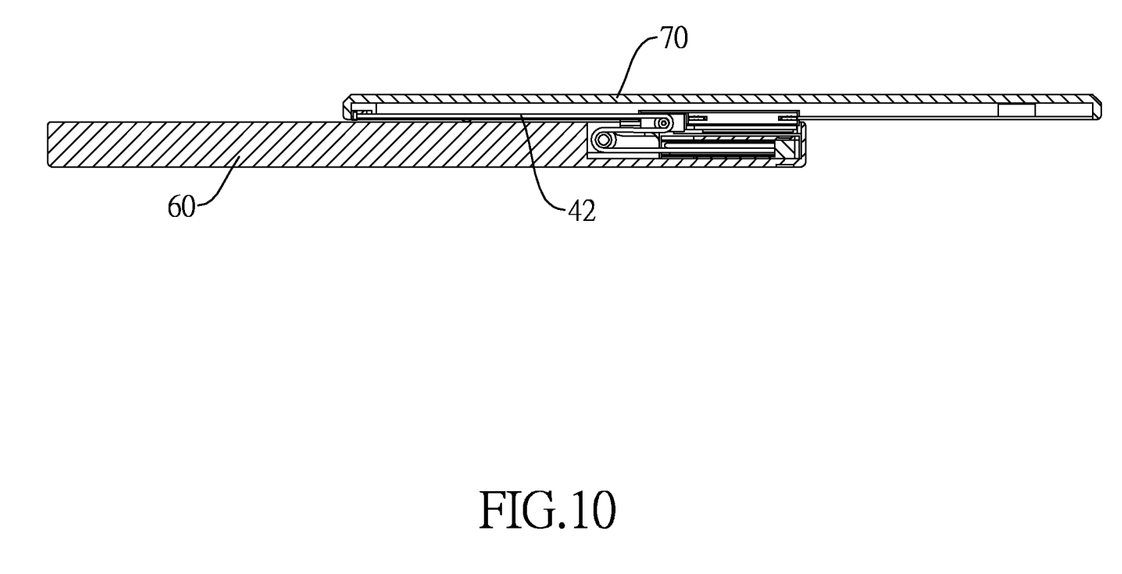
FIG. 10 is an operational side view in partial section of the portable device in FIG. 6, shown opening.
Figure 11:
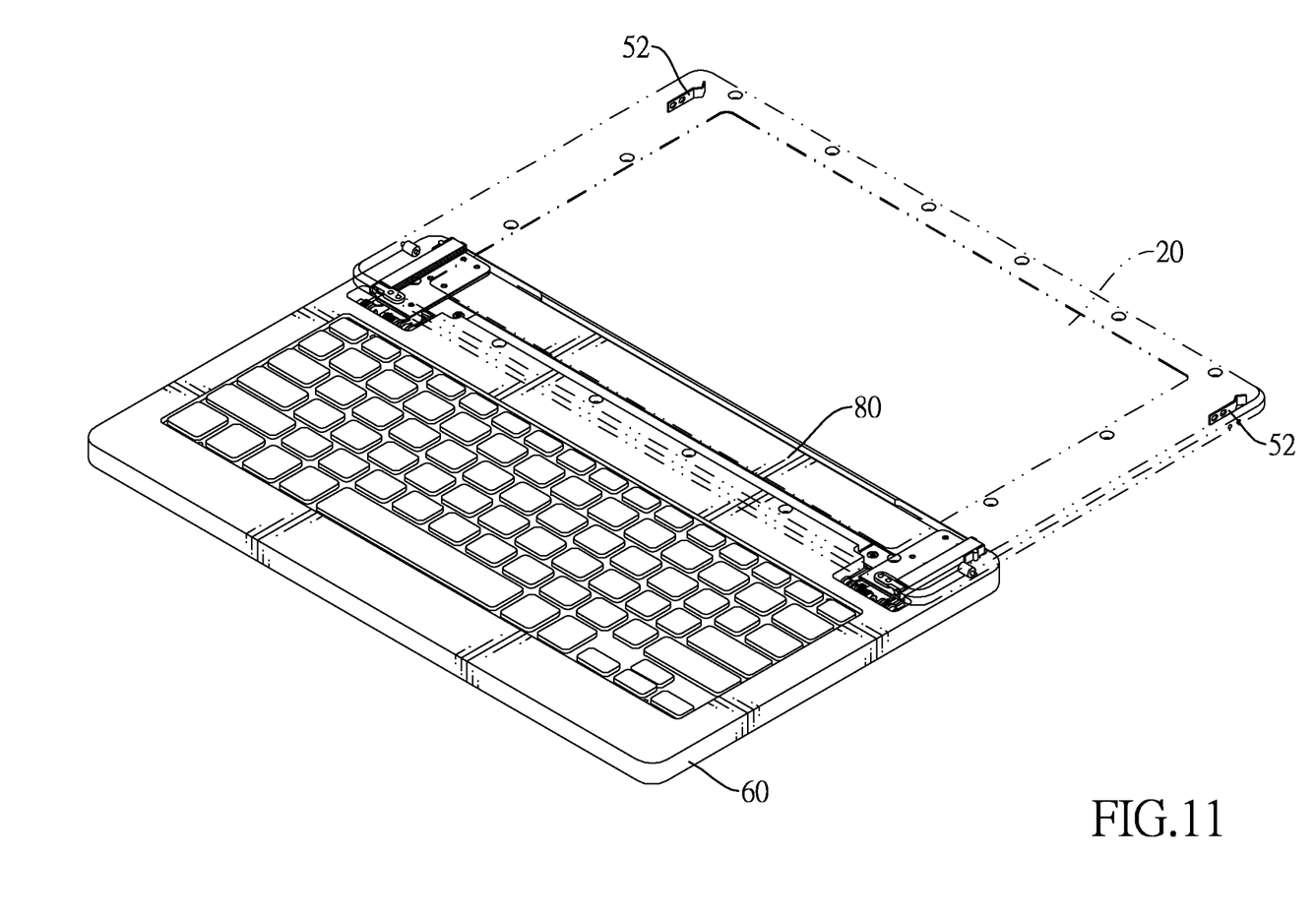
FIG. 11 is an operational top view of the portable device in FIG. 6, shown fully opened.
Figure 12:
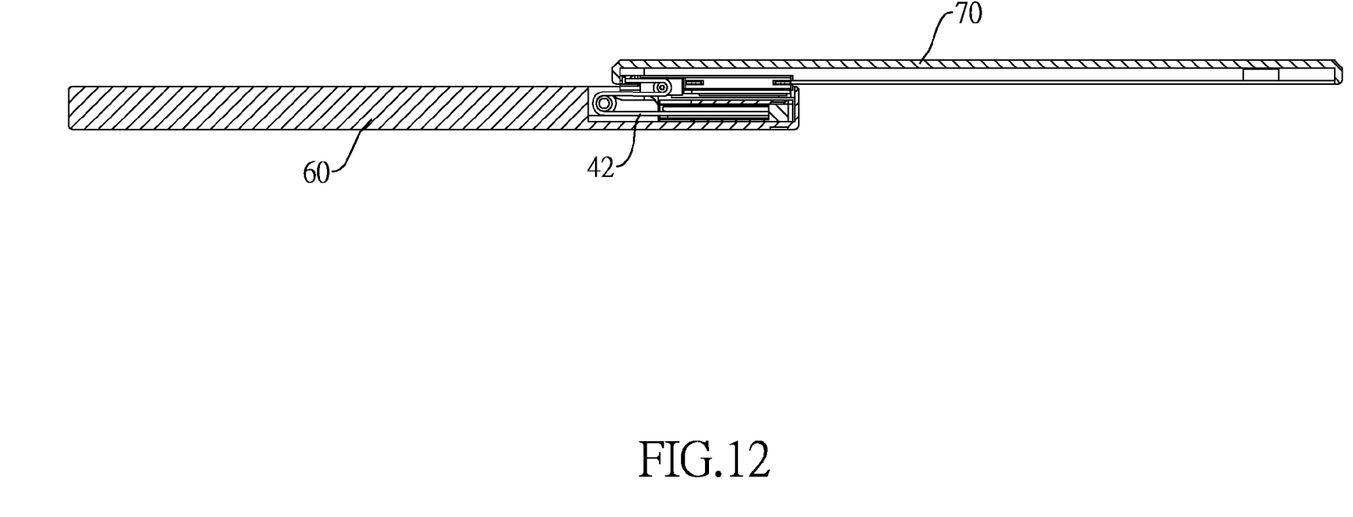
FIG. 12 is an operational side view in partial section of the portable device in FIG. 6, shown fully opened.

With reference to FIGS. 7 and 8, when the cover 70 is closed relative to the base 60, the stationary resilient sheets 51 hold the sliding resilient sheets 52 to resist the resilience of the plate spring assembly 42. Thus, the cover 70 is held closed stably.

With reference to FIGS. 9 to 12, the cover 70 is slid to open. The cover 70 is pushed to release the sliding resilient sheets 52 from the stationary resilient sheets 51. Once the sliding resilient sheets 52 are released from the stationary resilient sheets 51, the resilience of the plate spring assemblies 42 pulls the mounting panel 20 to slide relative to the main brackets 10. Then, the cover 70 is slid relative to the base 60 until the cover 70 is fully opened. The plate spring assemblies 42 help the cover 70 to be fully opened without other external forces. Therefore, the cover 70 is kept at a fully opened status to be pivoted easily. Further, the connecting panel 80 keeps the two sliding hinges as described to move simultaneously, so that the sliding hinges as described are not damaged because of different displacements.

Figure 13:
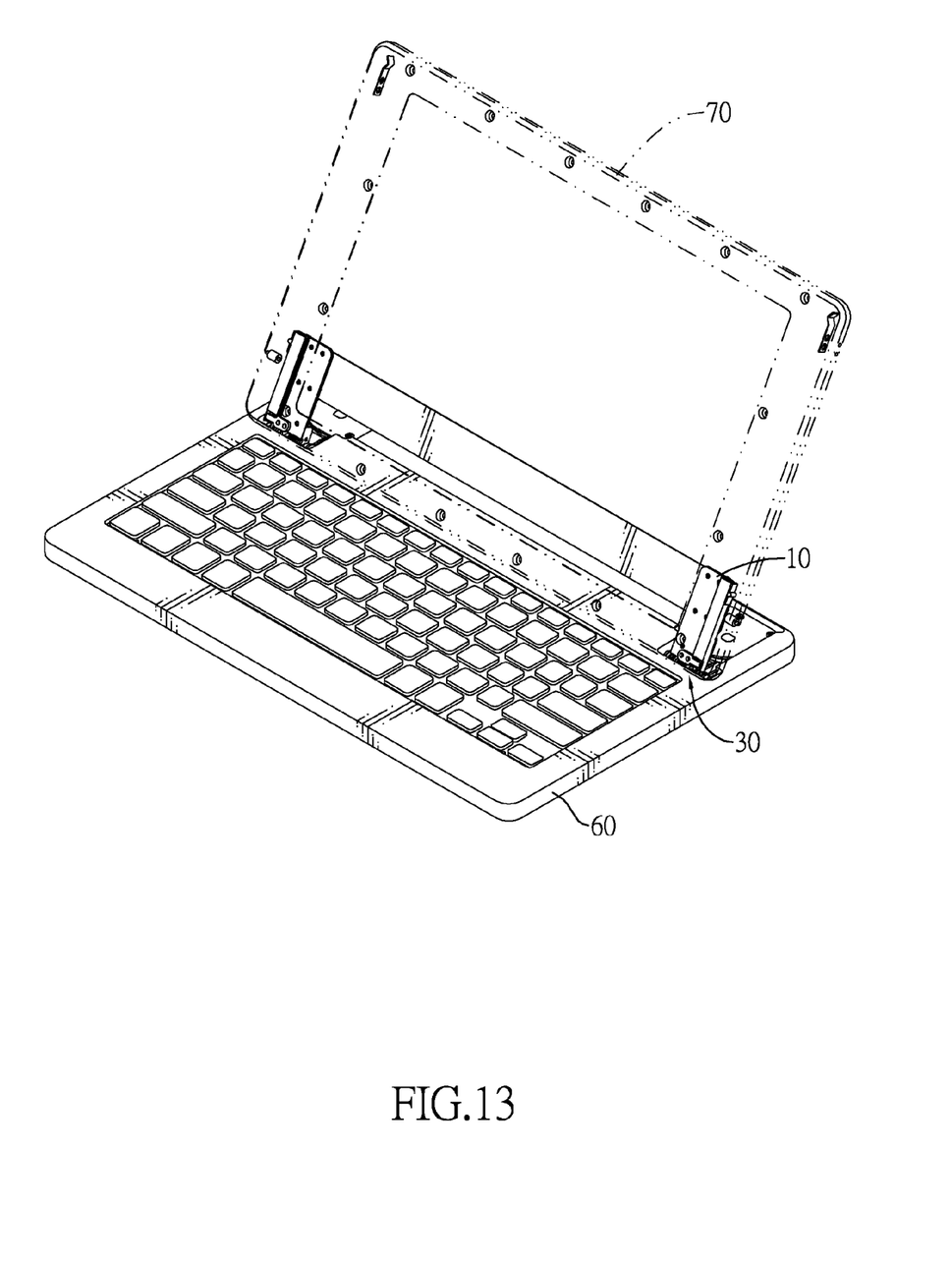
FIG. 13 is an operational top view of the portable device in FIG. 6, shown tilted.
Figure 14:
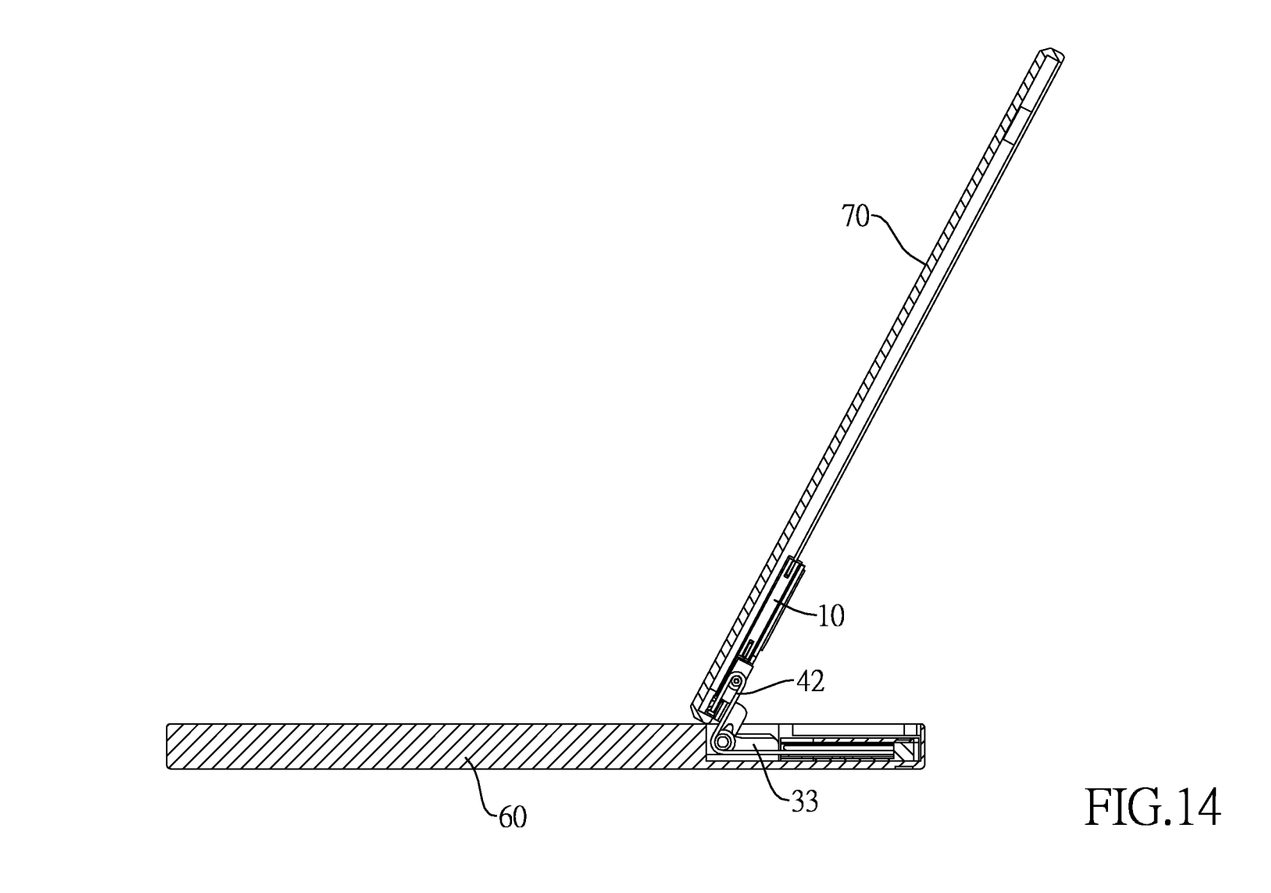
FIG. 14 is an operational side view in partial section of the portable device in FIG. 6, shown tilted.

With reference to FIGS. 13 and 14, the cover 70 is fully opened. The user may pivot the cover 70 as desired. The mounting panel 20 moves the main brackets 10 and the rotating brackets 31 to pivot relative to the stationary brackets 33, so that the cover 70 is tilted relative to the base 60. The user tilts the cover 70 to adjust the visual angle. The connecting panel 80 keeps the two sliding hinges as described to pivot simultaneously, so that the sliding hinges as described are not damaged because of different pivoting angles.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A sliding hinge comprising:
    a main bracket having:
        a sliding track mounted on an inner side of the main bracket; and
        a first roller mounted pivotally in the main bracket;
    a mounting panel mounted slidably in the sliding track of the main bracket;
    a tilting assembly connected to the main bracket and comprising:
        a rotating bracket attached securely to the main bracket;
        a pivoting rod mounted rotatably through the rotating bracket; and
        a stationary bracket mounted securely around the pivoting rod; and
    a recovery assembly connected to the tilting assembly and comprising:
        a roller assembly connected to the stationary bracket of the tilting assembly and having:
            a pintle mounted securely through the stationary bracket; and a second roller mounted rotatably around the pintle; and a plate spring assembly having:
  a hub;
  a plate spring surrounding the hub;
  a bobbin surrounding the plate spring; and
  a tether having a front part attached across the second roller and the first roller in sequence and attached securely to the mounting panel, and having a rear part attached around the bobbin; wherein directions of rotations of the first and second rollers are opposite during use.

2. The sliding hinge as claimed in claim 1, wherein the main bracket comprises an upper bracket having a receiving recess formed by bending one side of the upper bracket and having an opening facing the inner side of the main bracket; a lower bracket attached securely to the upper bracket and having a mounting recess formed on an outer side of the lower bracket; and a pivoting seat mounted securely in the mounting recess and having a top opening and a bottom opening; the sliding track of the main bracket is mounted securely in the receiving recess of the upper bracket; and the first roller is mounted pivotally in the pivoting seat.

3. The sliding hinge as claimed in claim 2, wherein the stationary bracket of the tilting assembly has a first stationary spacer and a second stationary spacer respectively formed on an edge of the stationary bracket and separated from each other; and the pivoting rod is mounted securely through the first stationary spacer.

4. The sliding hinge as claimed in claim 3, wherein the tilting assembly comprises a torsion generating assembly mounted around the pivoting rod, mounted between the first and second stationary spacers and attached to the first stationary spacer.

5. The sliding hinge as claimed in claim 4 further comprising a locking assembly mounted on an outer side of the main bracket and having:
  a stationary resilient sheet attached securely on the outer side of the main bracket and having an actuating segment formed thereon; and
  a sliding resilient sheet attached securely on the mounting panel, slid simultaneously with the mounting panel, selectively held by the stationary resilient sheet and having an actuating segment formed thereon and corresponding to and selectively abutting the actuating segment of the stationary resilient sheet.

6. A sliding hinge comprising:
a main bracket having:
  a sliding track mounted on an inner side of the main bracket; and
  a first roller mounted pivotally in the main bracket;
a mounting panel mounted slidably in the sliding track of the main bracket;
a tilting assembly connected to the main bracket and comprising:
  a rotating bracket attached securely to the main bracket;
  a pivoting rod mounted rotatably through the rotating bracket; and
  a stationary bracket mounted securely around the pivoting rod;
a recovery assembly connected to the tilting assembly and comprising:
  a roller assembly connected to the stationary bracket of the tilting assembly and having:
    a pintle mounted securely through the stationary bracket; and
    a second roller mounted rotatably around the pintle; and
  a plate spring assembly having:
    a hub;
    a plate spring surrounding the hub;
    a bobbin surrounding the plate spring; and
    a tether having a front part attached across the second roller and the first Roller in sequence and attached securely to the mounting panel, and having a rear part Attached around the bobbin; and
a locking assembly mounted on an outer side of the main bracket and having:
  a stationary resilient sheet attached securely on the outer side of the main bracket and having an actuating segment formed thereon; and
  a sliding resilient sheet attached securely on the mounting panel, slid simultaneously with the mounting panel, selectively held by the stationary resilient sheet and having an actuating segment formed thereon and corresponding to and selectively abutting the actuating segment of the stationary resilient sheet.

7. The sliding hinge as claimed in claim 6, wherein:
the main bracket comprises:
an upper bracket having a receiving recess formed by bending one side of the upper bracket and having an opening facing the inner side of the main bracket;
a lower bracket attached securely to the upper bracket and having a mounting recess formed on an outer side of the lower bracket; and
a pivoting seat mounted securely in the mounting recess and having a top opening and a bottom opening;
the sliding track of the main bracket is mounted securely in the receiving recess of the upper bracket; and
the first roller is mounted pivotally in the pivoting seat.

8. A sliding hinge comprising:
a main bracket having:
  a sliding track mounted on an inner side of the main bracket; and
  a first roller mounted pivotally in the main bracket;
a mounting panel mounted slidably in the sliding track of the main bracket;
a tilting assembly connected to the main bracket and comprising:
  a rotating bracket attached securely to the main bracket;
  a pivoting rod mounted rotatably through the rotating bracket; and
  a stationary bracket mounted securely around the pivoting rod; and
a recovery assembly connected to the tilting assembly and comprising:
  a roller assembly connected to the stationary bracket of the tilting assembly and having:
    a pintle mounted securely through the stationary bracket; and
    a second roller mounted rotatably around the pintle; and
  a plate spring assembly having:
    a hub;
    a plate spring surrounding the hub;
    a bobbin surrounding the plate spring; and
    a tether having a front part attached across the second roller and the first roller in sequence and attached securely to the mounting panel, and having a rear part attached around the bobbin;
wherein the stationary bracket of the tilting assembly has a first stationary spacer and a second stationary spacer respectively formed on an edge of the stationary bracket and separated from each other; and the pivoting rod is mounted securely through the first stationary spacer.

* * * * *